(12) United States Patent
Mähling et al.

(10) Patent No.: US 6,727,326 B2
(45) Date of Patent: Apr. 27, 2004

(54) METHOD FOR THE CONTINUOUS PRODUCTION OF ETHYLENE HOMO- AND ETHYLENE CO-POLYMERS

(75) Inventors: Frank-Olaf Mähling, Mannheim (DE); Dieter Littmann, Budenheim (DE); Andreas Daiss, Mannheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/258,940

(22) PCT Filed: Apr. 30, 2001

(86) PCT No.: PCT/EP01/04839
§ 371 (c)(1),
(2), (4) Date: Oct. 29, 2002

(87) PCT Pub. No.: WO01/85807
PCT Pub. Date: Nov. 15, 2001

(65) Prior Publication Data
US 2003/0181632 A1 Sep. 25, 2003

(30) Foreign Application Priority Data
May 5, 2000 (DE) .......................... 100 21 886

(51) Int. Cl.$^7$ .................................................. C08F 2/00
(52) U.S. Cl. ............................ 526/64; 526/65; 526/68; 526/348; 526/352
(58) Field of Search .................. 526/64, 352, 348, 526/65, 68

(56) References Cited

U.S. PATENT DOCUMENTS

| 3,628,918 A | 12/1971 | Beals et al. |
| 3,721,126 A | 3/1973 | Beals et al. |
| 3,806,499 A | * 4/1974 | Mancini ....................... 526/64 |
| 4,175,169 A | 11/1979 | Beals et al. |

FOREIGN PATENT DOCUMENTS

| DE | 21 24 011 | 11/1971 |
| DE | 1 164 017 | 6/1972 |
| DE | 137 591 | 9/1979 |
| DE | 146 298 | 2/1981 |
| DE | 41 02 808 | 8/1992 |
| DE | 197 54039 | 6/1999 |
| EP | 082 502 | 6/1983 |

* cited by examiner

Primary Examiner—William Cheung
(74) Attorney, Agent, or Firm—Keil & Weinkauf

(57) ABSTRACT

The invention relates to a method for the continuous production of ethylene homo- and ethylene co-polymers in the presence of radical polymerisation initiators and, optionally, molecular weight regulators in a tubular reactor with a hot water jacket and one or several reaction zones at pressures of 1000 to 4000 bar and temperatures of 120° C. to 350° C. The hot water jacket of each reaction zone is divided into two independently-controllable, separate, longitudinal sections and the water exit temperature from the tubular jacket of the first longitudinal section per reaction zone, extending between the point of initiator addition and 20 to 50% of the reaction zone length, is set to 180° C. to 210° C. and in the following second longitudinal section of said reaction zone the hot water exit temperature from the tube jacket is set to 140° C. to 180° C.

5 Claims, No Drawings

METHOD FOR THE CONTINUOUS PRODUCTION OF ETHYLENE HOMO- AND ETHYLENE CO-POLYMERS

The present invention relates to a process for the continuous preparation of ethylene homopolymers and ethylene copolymers in the presence of free-radical polymerization initiators and in the presence or absence of molecular weight regulators in a tube reactor having a hot water jacket and one or more reaction zones at pressures in the range from 1000 to 4000 bar and temperatures of from 120° C. to 350° C., where the hot water jacket of each reaction zone is divided into at least two independently regulatable, separate longitudinal sections.

The present invention further provides novel ethylene homopolymers and copolymers and provides for their use.

The homopolymerization and copolymerization of the ethylene by the high-pressure bulk process is generally known. The reactors used are usually operated continuously at pressures of from 150 to 350 MPa and temperatures of from 150° C. to 350° C. using mean residence times of from 30 to 120 seconds (Ullmann's Encyclopädie der technischen Chemie, 4th Edition, Vol. 19/1980/pp. 169–178).

The quality and conversion attained of the polymers produced is determined largely by the temperature conditions in the reactor, with the achievable conversion being proportional to the quantity of heat removed. Part of the heat generated in the polymerization is removed via the reactor walls and can there be, for example, passed to a cooling medium. A problem which frequently occurs is that even at high temperatures and high pressures, high molecular weight polymer depositions are formed on the cooled interior walls of the reactor. Since polyethylene is a poor conductor of heat, this drastically reduces heat transfer. If the removal of heat is insufficient, the ethylene can decompose explosively as a result of the temperature increase. To avoid such polymer deposits, various methods of operating the reactor have been developed.

DE 4102808-A describes the temperature profile in a high-pressure multizone reactor, where the temperature of the hot water leaving the jacket directly upstream of the peroxide introduction point is controlled so that the temperature difference between introduction point and a second temperature measurement point is from 8 to 30° C. The hot water outlet temperature is from 207° C. to 225° C.

In DD 146 298 polyethylene having improved properties is obtained by means of specific temperatures in the cooling water circuit. The heat transfer medium fed into the cooling jacket is set to temperatures of from 215° C. to 235° C. along the reactor. The temperature of the heat transfer medium must at the same time be no more than 70° C.–95° C. below the maximum temperature of the reaction mixture in the respective reaction zone.

A further specific temperature profile for optimizing the polymer quality is described in DD 137 591. The temperature difference between the interior wall of the reactor and the stream in the middle of the reactor is maintained in a defined region, where this temperature difference within a reaction zone between the temperature at the introduction point for the initiator and the temperature maximum is smaller than that between the temperature maximum and the temperature at the location of renewed introduction of the monomer. In addition, the patent teaches that this temperature difference, particularly in the first reaction zone up to the first temperature maximum, should be kept particularly small. The cooling water used is at from 237° C. to 247° C.

The abovementioned processes are all relatively complicated.

It is an object of the present invention to achieve a good balance between conversion and product quality using a simple temperature profile of the cooling medium.

We have found that this object is achieved by a process for the continuous preparation of ethylene homopolymers and ethylene copolymers in the presence of free-radical polymerization initiators and in the presence or absence of molecular weight regulators in a tube reactor having a hot water jacket and one or more reaction zones at pressures in the range from 1000 to 4000 bar and temperatures of from 120° C. to 350° C., where the hot water jacket of each reaction zone is divided into at least two independently regulatable, separate longitudinal sections, wherein the hot water outlet temperature from the jacket of the first longitudinal section of each reaction zone, which extends over the region in between the initiator introduction point and from 20 to 50% of the reaction zone length, is set to from 180° C. to 210° C. and the hot water outlet temperature from the jacket in the subsequent, second longitudinal section of this reaction zone is set to from 140° C. to 180° C. Preference is given to hot water outlet temperatures from the jacket of from 190° C. to 210° C. in the first longitudinal section and from 150° C. to 180° C. in the subsequent longitudinal section. The hot water jacket of each reaction zone is preferably divided into two independently regulatable, separate longitudinal sections.

In the following, a reaction zone is in each case the zone commencing at an initiator introduction point up to before the next initiator introduction point. It usually has a temperature maximum beyond which the polymer/monomer mixture becomes cooler again.

According to the present invention, it has been found that the region between the initiator introduction point and from 20 to 50% of the reaction zone length after the initiator introduction point is particularly susceptible to polymer deposits. These deposits are prevented by an increased temperature in the hot water jacket in this region. It may be assumed, without being tied to this theory, that mixing of the initiator with the polymerization stream does not occur quickly enough in this region, thus leading to polymer deposits. A hot water outlet temperature of from 180° C. to 210° C., preferably from 190° C. to 210° C., is preferably set in the hot water jacket between the initiator introduction point and from 20 to 40% of the reaction zone length, very particularly preferably between the initiator introduction point and from 20 to 30% of the reaction zone length, in order to prevent the polymer deposits. The hot water inlet temperature is usually from 1° C. to 30° C., preferably from 2° C. to 20° C. and particularly preferably from 2° C. to 10° C., lower than the respective hot water outlet temperature.

The process of the present invention can be employed either for the homopolymerization of ethylene or for the copolymerization of ethylene with other monomers, provided that these monomers copolymerize with ethylene by a free radical mechanism under high pressure. Examples of suitable copolymerizable monomers are $\alpha,\beta$-ethylenically unsaturated $C_3$–$C_8$-carboxylic acids, in particular maleic acid, fumaric acid, itaconic acid, acrylic acid, methacrylic acid and crotonic acid, $\alpha,\beta$-ethylenically unsaturated $C_4$–$C_{15}$-carboxylic esters or anhydrides, in particular methyl methacrylate, ethyl acrylate, n-butyl acrylate, methacrylic anhydride, maleic anhydride and itaconic anhydride, and $\alpha,\beta$-olefins such as propene, 1-butene, 1-pentene or 1-hexene. Vinyl acetate can also be used as comonomer. The proportion of comonomer or comonomers in the reaction mixture is preferably from 1 to 45% by weight, particularly preferably from 5 to 30% by weight. In these cases, the remainder of the reaction mixture is made up by ethylene.

The polymerization is carried out at pressures of from 500 to 5000 bar, preferably from 1500 to 4000 bar and particularly preferably from 2000 to 3300 bar. The reaction temperatures are above 40° C. It is advantageous for the reaction temperatures to be in the range from 120 to 350° C., preferably from 150 to 330° C.

In the process of the present invention, the molar mass of the polymers to be prepared can be controlled in a customary fashion by addition of molecular weight regulators. Examples of suitable regulators are aliphatic and olefinic hydrocarbons, e.g. pentane, hexane, cyclohexane, propene, pentene or hexene, ketones such as acetone, diethyl ketone or diamyl ketone, aldehydes such as formaldehyde or acetaldehyde and saturated aliphatic alcohols such as methanol, ethanol, propanol or butanol. Particular preference is given to using saturated aliphatic aldehydes, in particular propionaldehyde, or α-oleins such as propene or hexene. The molecular weight regulator is preferably metered into the reaction mixture upstream of the tube reactor. It can also be introduced together with the polymerization initiator at the various points along the tube reactor.

The polymerization is initiated in each reaction zone by addition of initiators which decompose into free radicals. As free-radical polymerization initiators, it is possible to use any compounds which form free radicals. Peroxides which decompose to form free radicals, preferably organic peroxides, or air or oxygen can be used.

Examples of suitable compounds which form free radicals are organic peroxides such as peresters, perketal, peroxy ketones and percarbonates, for example di-2-ethylhexyl peroxydicarbonate, di-cyclohexylperoxydicarbonate, diacetyl peroxydicarbonate, di-tert-butyl peroxide, cumyl perneodecanoate, tert-amyl perpivalate, tert-butyl perneodecanoate, tert-butyl permaleate, tert-butyl perpivalate, tert-butyl perisononanoate, diisopropylbenzene hydroperoxide, cumene hydroperoxide, tert-butyl perbenzoate, methyl isobutyl ketone hydroperoxide or 2,2-bis(tert-butylperoxy)butane. Other suitable initiators are azodicarboxylic esters, azodicarboxylic dinitriles, e.g. azobisisobutyronitrile, and hydrocarbons which decompose into free radicals, also known as C—C initiators, e.g. 1,2-diphenyl-1,2-dimethylethane and 1,1,2,2-tetramethylethane derivatives.

The initiators can be employed individually or in admixture in concentrations of from 0.5 to 100 ppm, in particular from 0.5 to 50 ppm, based on the amount of monomers. It is advantageous to use the initiators in dissolved form. Examples of suitable solvents are aliphatic hydrocarbons, in particular octane and isodecane.

The total amount of monomer and comonomer can be introduced in one step. In a preferred embodiment, polymerization initiator is metered in at a plurality of points, e.g. from 2 to 6 points, particularly preferably from 3 to 5 points, along the tube reactor so as to form, for example, from 2 to 6 reaction zones which all have the hot water jacket divided according to the present invention.

The hot water jacket of each reaction zone is preferably divided into two separate longitudinal sections. However, the invention also encompasses analogous embodiments in which the hot water jacket is, for example, further divided but the same temperature profile is to be achieved. Likewise, the invention also encompasses embodiments in which the division according to the present invention of the hot water jacket into the two regions having different hot water outlet temperatures is combined with reaction zones in which the hot water jacket is not divided or which have no hot water jackets. The reaction zones which do not have the hot water jacket divided according to the present invention are preferably located at the end of the reactor, and are particularly preferably located downstream of from 1 to 3 reaction zones having a hot water jacket divided according to the present invention.

The ratio of length to diameter of the tube reactor is preferably in the range from 10,000 to 50,000, particularly preferably from 15,000 to 35,000.

In general, the mean residence time of the reaction mixture in the tube reactor is in the range from 30 to 300 seconds, preferably from 30 to 120 seconds.

After the last introduction of the polymerization initiator, the reaction mixture is cooled so that the product can be discharged from the reactor without thermal damage. The reaction mixture is discharged via a suitable high-pressure depressurization valve system at the outlet end of the tube reactor. After discharge of the reaction mixture, the polymer is separated from unreacted ethylene and any unreacted comonomer by depressurization, after which the monomers are generally recirculated to the reactor.

The process of the present invention can also be carried out analogously using a backmixed reactor installed upstream of the tube reactor. After the polymerization in the backmixer has abated, the polymerization mixture together with still unreacted monomers is passed via a high-pressure tube, which may be connected to a heat exchanger, to the tube reactor where the process is continued as described above. In general, the mean residence time of the mixture in the backmixed reactor is from 10 to 100 seconds, in particular from 10 to 30 seconds, and that in the tube reactor is from 10 to 200 seconds, in particular from 10 to 100 seconds.

In the preferred embodiments, an additional measure employed to avoid polymer deposits, in addition to the hot water outlet temperatures according to the present invention, is to set a higher flow velocity of the polymerization mixture in the tube reactor in the regions having hot water outlet temperatures of from 180° C. to 210° C. than in the regions having hot water outlet temperatures of from 140° C. to 180° C.

Accordingly, particular preference is given to a process in which the tube reactor has at least two reaction zones and cooled or preheated monomer and/or cooled or preheated comonomer is additionally introduced as fresh gas stream upstream of or at the beginning of each reaction zone (multiple cold gas feed). The flow velocity can be increased by the addition of further monomer, thus additionally helping to avoid formation of deposits. The introduction of the monomer or monomers can be carried out upstream of the introduction of further initiator or together with the initiator. Preference is given to at least three successive reaction zones, where the polymerization in each stage has to be restarted by addition of the appropriate initiators. Reactors suitable for carrying out the process are, inter alia, tube reactors which are provided with a series of inlets for the initiator and, if desired, for the introduction of further amounts of monomers. In general, the tube reactor has a ratio of length to diameter of at least 10,000, preferably more than 15,000, at a length of from 120 to 2500 m. The tube reactor is advantageously arranged in a wound form.

In another preferred embodiment, the tube region having hot water outlet temperatures from the jacket of from 180° C. to 210° C. has in each case a smaller internal diameter than the subsequent tube region having hot water outlet temperatures from the jacket of from 140° C. to 180° C. Such types of tube reactors, albeit without a hot water jacket, are described, for example, in DE 2124011 C3 for the avoidance of pressure drops. This reduction in the internal diameter also increases the flow velocity in the first region of the individual reaction zones. These tube reactors having changing cross sections can also be operated in combination with the above-described multiple cold gas feed.

In a particularly preferred embodiment, the tube reactor having the abovementioned changing cross sections comprises from 2 to 6 reaction zones and the tube regions having hot water outlet temperatures from the jacket of from 180° C. to 210° C. and having the smaller internal diameter all have the same internal diameter and the tube regions having hot water outlet temperatures from the jacket of from 140° C. to 180° C. and the larger internal diameter have an internal diameter which decreases from region to region in the direction of flow. This gives a reactor in a type of reverse telescopic form.

The invention further provides the ethylene homopolymers and ethylene copolymers which can be prepared by the process of the present invention and provides for their use for producing films, coating materials and photoresists and as fluidizers in middle petroleum distillates.

By means of the process of the present invention, the polymers can be prepared safely and in a precisely reproducible fashion without thermal decomposition of the monomers occurring in the reactors. The polymers of the present invention have densities of from 915 to 940 kg/m$^3$. The density can be influenced, for example, via the polymerization temperature and the polymerization pressure and/or the comonomer concentration. Their melt flow index in accordance with DIN 53 735 is in the range from 0.2 to 40 g/10 min, in particular less than 4 g/10 min. Films produced from the polymers of the present invention have excellent optical properties. Polymers having densities above 925 kg/m$^3$ can be prepared at conversions of more than 25% in the above-described way.

| | |
|---|---|
| T in | Gas inlet temperature |
| PD | Pressure drop in the reactor |
| RZ | Reaction zone |
| Tw in | Cooling water inlet temperature of all RZs |
| Tw1 | Cooling water outlet temperature of RZ 1, 1st section |
| Tw2 | Cooling water outlet temperature of RZ 1, 2nd section |
| Tw3 | Cooling water outlet temperature of RZ 2, 1st section |
| Tw4 | Cooling water outlet temperature of RZ 2, 2nd section |
| Tw5 | Cooling water outlet temperature of RZ 3, 1st section |
| Tw6 | Cooling water outlet temperature of RZ 3, 2nd section |
| PO | Peroxide |
| Twin 1, 3, 5 | Cooling water inlet temperature of RZ 1, 1st section, and RZ 2, 1st section, and RZ 3, 1st section, |
| Twin 2, 4, 6 | Cooling water inlet temperature of RZ 1, 2nd section, and RZ 2, 2nd section, and RZ 3, 2nd section, |
| T in 1 | Gas inlet temperature of RZ 1, 1st section |
| T in 3 | Gas inlet temperature of RZ 2, 1st section |
| T in 5 | Gas inlet temperature of RZ 3, 1st section |

The product parameters shown in the tables were obtained by the following measurement methods:
Conversion: production [t/h]/ethylene throughput [t/h]
Density: in accordance with ISO 1183
MFI: Melt flow index MFI (190° C./2.16) in accordance with ISO 1133
Longitudinal elongation at break: from tensile test in accordance with DIN 53455

COMPARATIVE EXAMPLES 1 and 2

S Reactor

Internal diameter: 39 mm, gas throughput over the entire reactor: 31 t/h. Initiation is carried out by means of peroxide initiator mixtures at three points along the reactor, namely at the beginning, after 40% of the total reactor length and after 70% of the total reactor length. The three reaction zones are each divided into two separate cooling zones (first longitudinal section of each reaction zone: from initiator introduction point to 40% of the reaction zone length, second longitudinal section: from 40% to the end of the reaction zone). The cooling water inlet temperature is identical in all reaction zones of the reactor. The polymerization conditions can be taken from Table 1.

The polymerization was carried out in an S-reactor. Propionaldehyde was used as molecular weight regulator. The initiator mixture consisted of up to three organic peroxides (decomposing at low, intermediate and high temperatures) and was metered directly into the reactor as a solution in an aliphatic solvent. Each setting was run for about 24 hours, and the product data of the last batch in each case are shown in Table 1.

EXAMPLE 3

According to the Present Invention

The S reactor described in Comparative Examples 1 and 2 is now operated using different hot water outlet temperatures in each reaction zone. Polymerization conditions and product data are shown in Table 1. It can be seen that improved product quality can be obtained without a drop in the productivity. Virtually no polymer deposits are observed.

Carrying out the reaction presented no difficulties at all and thermal decomposition of the ethylene also did not occur. Owing to its excellent mechanical and optical properties, the ethylene homopolymer prepared according to the present invention was very suitable for the production of packaging for heavy goods, small hollow bodies for the medical sector and laminating films.

TABLE 1

| Ex. | PD | Twin 1, 3, 5 [° C.] | Twin 2, 4, 6 [° C.] | Tw1 [° C.] | Tw2 [° C.] | Tw3 [° C.] | Tw4 [° C.] | Tw5 [° C.] | Tw6 [° C.] |
|---|---|---|---|---|---|---|---|---|---|
| 1 | 495 | 161 | 161 | 163 | 166 | 165 | 164 | 164 | 167 |
| 2 | 470 | 195 | 195 | 197 | 201 | 200 | 198 | 198 | 199 |
| 3 | 490 | 190 | 162 | 192 | 167 | 195 | 167 | 194 | 166 |

| Ex. | T in [° C.] | PO consumption [g/t of PE] | Conversion [%] | Density [kg/m³] | MFI [dg/min] | Drawability [μm] | Scattering value [%] | Longitudinal elongation at break [%] |
|---|---|---|---|---|---|---|---|---|
| 1 | 169 | 312 | 26.8 | 923.7 | 0.83 | 26 | 23 | 270 |
| 2 | 164 | 326 | 26.0 | 923.3 | 0.89 | 21 | 19 | 310 |
| 3 | 165 | 304 | 26.8 | 923.5 | 0.87 | 21 | 20 | 305 |

EXAMPLES 4 to 7

Experiments in the S Reactor with Inverse Telescopic Form in the Cooling Regions The internal diameter of the reactor remains constant in the actual reaction zones, but is reduced from cooling zone to cooling zone. The gas throughput over the entire reactor is 31 t/h. In the regions where the temperature drops (i.e. the cooling zones), the internal tube diameter is 51 mm (in reaction zone 1), 45 mm (in reaction zone 2) or unchanged at 39 mm (in reaction zone 3). The internal tube diameter is each time reduced back to 39 mm immediately before the initiator feed points. (sequence: 39 mm, 51 mm, 39 mm, 45 mm, 39 mm.)

Regions where the temperature rises and regions where the temperature drops can be cooled to different degrees (water temperature and water throughput). Table 2 shows that reducing the water temperature in the reactor regions having a reduced flow velocity of the reaction medium made it possible to achieve a production increase by up to 10% together with stable polymerization conditions and excellent product quality.

Examples 4 to 6 are comparative examples, Example 7 is according to the present invention. The polymerization conditions and the product data can be taken from Table 2.

EXAMPLES 8 to 11

Experiments in the MKE Reactor Having a Constant Internal Diameter

The reactor has a constant internal diameter of 39 mm over its entire length. The fresh ethylene is divided into three streams after the post-compressor and fed in at various points along the reactor, directly upstream of the next reaction initiation. Immediately after the introduction of the ethylene, the initiator mixture is fed in in order to initiate the polymerization. The mass flows in the reaction zones are 15 t/h, 22 t/h and 31 t/h. The flow velocity of the reaction medium increases from each reaction zone to the next reaction zone. The deliberately low flow velocities in RZ1 and RZ2 led to a reduction in the pressure drop and to an increase in the productivity.

Examples 8 to 10 are comparative examples, Example 11 is according to the present invention. The polymerization conditions and the product data can be taken from Table 3.

TABLE 2

| Ex. | PD | Twin 1, 3, 5 [° C.] | Twin 2, 4, 6 [° C.] | Tw1 [° C.] | Tw2 [° C.] | Tw3 [° C.] | Tw4 [° C.] | Tw5 [° C.] | Tw6 [° C.] |
|---|---|---|---|---|---|---|---|---|---|
| 4 | 455 | 161 | 161 | 164 | 166 | 165 | 164 | 164 | 167 |
| 5 | 420 | 195 | 196 | 198 | 200 | 200 | 199 | 198 | 199 |
| 6 | 450 | 161 | 195 | 164 | 200 | 166 | 200 | 165 | 199 |
| 7 | 425 | 195 | 164 | 198 | 168 | 200 | 168 | 198 | 169 |

| Ex. | T in [° C.] | PO Consumption [g/t PE] | Conversion [%] | Density [kg/m³] | MFI [dg/min] | Drawability [μm] | Scattering value [%] | Longitudinal elongation at break [%] |
|---|---|---|---|---|---|---|---|---|
| 4 | 168 | 310 | 27.4 | 923.7 | 0.85 | 25 | 23 | 280 |
| 5 | 165 | 305 | 26.5 | 923.1 | 0.84 | 22 | 23 | 315 |
| 6 | 169 | 338 | 26.9 | 923.2 | 0.89 | 24 | 24 | 310 |
| 7 | 164 | 325 | 27.5 | 923.4 | 0.83 | 19 | 19 | 330 |

TABLE 3

| Ex. | PD | T in 1 [° C.] | T in 3 [° C.] | T in 5 [° C.] | Twin 1, 3, 5 [° C.] | Twin 2, 4, 6 [° C.] | Tw1 [° C.] | Tw2 [° C.] | Tw3 [° C.] | Tw4 [° C.] | Tw5 [° C.] | Tw6 [° C.] |
|---|---|---|---|---|---|---|---|---|---|---|---|---|
| 8 | 390 | 169 | 56 | 56 | 162 | 161 | 164 | 166 | 166 | 164 | 166 | 166 |
| 9 | 375 | 164 | 55 | 56 | 196 | 196 | 198 | 200 | 201 | 199 | 199 | 199 |
| 10 | 385 | 167 | 56 | 57 | 161 | 196 | 163 | 199 | 165 | 199 | 165 | 199 |
| 11 | 390 | 167 | 56 | 58 | 194 | 163 | 196 | 166 | 200 | 167 | 198 | 168 |

| Ex. | PO Consumption [g/t PE] | Conversion [%] | Density [kg/m$^3$] | MFI [dg/min] | Drawability [μm] | Scattering value [%] | Longitudinal elongation at break [%] |
|---|---|---|---|---|---|---|---|
| 8 | 350 | 28.1 | 923.7 | 0.85 | 24 | 24 | 300 |
| 9 | 355 | 26.9 | 923.3 | 0.86 | 22 | 21 | 305 |
| 10 | 348 | 28.0 | 923.4 | 0.89 | 25 | 22 | 290 |
| 11 | 340 | 28.3 | 923.4 | 0.85 | 21 | 18 | 325 |

We claim:

1. A process for the continuous preparation of ethylene homopolymers and ethylene copolymers in the presence of free-radical polymerization initiators and in the presence or absence of molecular weight regulators in a tubular reactor having a hot water jacket and one or more reaction zones at pressures in the range from 1000 to 4000 bar and temperatures of from 120° C. to 350° C., where the hot water jacket of each reaction zone is divided into at least two independently regulatable, separate longitudinal sections, wherein the hot water outlet temperature from the jacket of the first longitudinal section of each reaction zone, which extends over the region in between the initiator addition point and from 20 to 50% of the reaction zone length, is set to from 180° C. to 210° C. and the hot water outlet temperature from the jacket in the subsequent, second longitudinal section of this reaction zone is set to from 140° C. to 180° C.

2. A process as claimed in claim 1, wherein polymerization initiator is metered in at from 2 to 6 different points along the tube reactor.

3. A process as claimed in claim 1, wherein the tube reactor has at least two reaction zones and additional cooled or preheated monomer and/or comonomer is introduced as a fresh gas stream upstream of or at the beginning of each reaction zone.

4. A process as claimed in claim 1, wherein the tube region having hot water outlet temperatures from the jacket of from 180° C. to 210° C. has in each case a smaller internal diameter than the subsequent tube region having hot water outlet temperatures from the jacket of from 140° C. to 180° C.

5. A process as claimed in claim 4, wherein the tube reactor comprises from 2 to 6 reaction zones and the tube regions having hot water outlet temperatures from the jacket of from 180° C. to 210° C. and having the smaller internal diameter all have the same internal diameter and the tube regions having hot water outlet temperatures from the jacket of from 140° C. to 180° C. and the larger internal diameter have an internal diameter which decreases from region to region in the direction of flow.

* * * * *